(12) United States Patent
Kalkmann

(10) Patent No.: US 11,101,681 B2
(45) Date of Patent: Aug. 24, 2021

(54) POWER CONVERTED ARRANGEMENT FOR FEEDING VEHICLES AND INSTALLATION COMPRISING THE SAME

(71) Applicant: SEMIKRON ELEKTRONIK GMBH & CO. KG, Nuremberg (DE)

(72) Inventor: Bernhard Kalkmann, Schwabach (DE)

(73) Assignee: SEMIKRON ELEKTRONIK GmbH & CO KG, Nuremberg (DE)

(*) Notice: Subject to any disclaimer, the term of this patent is extended or adjusted under 35 U.S.C. 154(b) by 626 days.

(21) Appl. No.: 15/896,741

(22) Filed: Feb. 14, 2018

(65) Prior Publication Data
US 2018/0290548 A1   Oct. 11, 2018

(30) Foreign Application Priority Data

Apr. 5, 2017   (DE) ........................ 10 2017 107355.8

(51) Int. Cl.
*H02J 7/02* (2016.01)
*B60L 11/18* (2006.01)
(Continued)

(52) U.S. Cl.
CPC ............. *H02J 7/02* (2013.01); *B60L 11/1812* (2013.01); *B60L 53/122* (2019.02); *B60L 53/14* (2019.02);
(Continued)

(58) Field of Classification Search
CPC ...... B60L 11/1812; B60L 53/22; B60L 53/67; B60L 53/14; B60L 53/122;
(Continued)

(56) References Cited

U.S. PATENT DOCUMENTS 5,625,545 A * 4/1997 Hammond ............. H02M 7/49
363/71
5,982,645 A * 11/1999 Levran ................. H01F 27/306
363/37

(Continued)

FOREIGN PATENT DOCUMENTS

CH  662679  * 12/1983
DE  1783279  1/1959
(Continued)

OTHER PUBLICATIONS

DE 10 2017 107 355.8, German Search Report and Written Opinion dated Sep. 29, 2017, 8 pages—German, pages—English.

*Primary Examiner* — Drew A Dunn
*Assistant Examiner* — Sailesh Thapa
(74) *Attorney, Agent, or Firm* — Andrew G. Young; Nolte Lackenbach Siegel

(57) ABSTRACT

A power converter arrangement, for feeding a plurality of energy stores of electrically driven vehicles has a transformer having a first multiphase winding and a plurality of second multiphase windings. The first winding is embodied to be connected to a power supply system, in particular to a medium-voltage power supply system, and the second windings are each connected to a first connection of an associated power converter. The invention also presents an installation having such a power converter arrangement, wherein the transformer is arranged in a weatherproof enclosure and at least a plurality of power converters form parts of respective charging stations.

7 Claims, 3 Drawing Sheets

(51) Int. Cl.
*B60L 53/22* (2019.01)
*B60L 53/67* (2019.01)
*B60L 53/14* (2019.01)
*B60L 53/122* (2019.01)
*H02J 7/00* (2006.01)
*B60L 53/34* (2019.01)

(52) U.S. Cl.
CPC ............ *B60L 53/22* (2019.02); *B60L 53/34* (2019.02); *B60L 53/67* (2019.02); *H02J 7/0027* (2013.01); *H02J 7/022* (2013.01); *B60L 2210/10* (2013.01); *B60L 2210/20* (2013.01); *B60L 2210/30* (2013.01); *B60L 2210/40* (2013.01); *Y02T 10/70* (2013.01); *Y02T 10/92* (2013.01)

(58) Field of Classification Search
CPC ............ B60L 2210/20; B60L 2210/40; B60L 2210/10; B60L 2210/30; B60L 53/34; H02J 7/0027; H02J 7/022; H02J 2207/20; H02J 7/02; H02J 2310/48; H02J 3/00; Y02T 10/92; Y02T 10/7005
See application file for complete search history.

(56) References Cited

U.S. PATENT DOCUMENTS

| | | | | |
|---|---|---|---|---|
| 2011/0291616 | A1* | 12/2011 | Kim | B60L 53/30 320/109 |
| 2013/0020989 | A1* | 1/2013 | Xia | B60L 53/30 320/109 |
| 2013/0307486 | A1* | 11/2013 | Chang | B60L 53/22 320/137 |
| 2014/0139182 | A1* | 5/2014 | Ichikawa | B60L 53/18 320/109 |
| 2016/0375781 | A1* | 12/2016 | Herke | B60L 11/1838 320/109 |
| 2018/0162229 | A1* | 6/2018 | Gotz | B60L 58/13 |
| 2019/0077270 | A1* | 3/2019 | Nieto | H01F 30/12 |
| 2019/0372465 | A1* | 12/2019 | Xu | H02M 7/06 |

FOREIGN PATENT DOCUMENTS

| | | |
|---|---|---|
| DE | 3342113 | 6/1984 |
| DE | 102010023262 | 12/2011 |
| DE | 102013109364 | 3/2015 |
| DE | 102015110023 | 12/2016 |
| EP | 2426804 | 3/2012 |
| JP | H08205301 | * 1/1995 |

* cited by examiner

POWER CONVERTED ARRANGEMENT FOR FEEDING VEHICLES AND INSTALLATION COMPRISING THE SAME

CROSS REFERENCE TO RELATED APPLICATIONS

This application relates to, and claims priority from DE 10 2017 107 355.8 filed Apr. 5, 2017 the entire contents of which are incorporated herein by reference.

FIGURE SELECTED FOR PUBLICATION

FIG. 3

BACKGROUND OF THE INVENTION

Field of the Invention

The invention describes a power converter arrangement for feeding a plurality of energy stores of electrically driven vehicles, wherein the electric drive is embodied as a purely electric drive or as a hybrid drive, for example in combination with an internal combustion engine. The invention further describes an installation having such a power converter arrangement and having a plurality of charging stations for the mentioned vehicles.

Description of the Related Art

From the generally known prior art, for example disclosed in U.S. Pat. No. 5,625,545, it is common to form a transformer having a first multiphase winding and a plurality of second multiphase windings. The second windings can in this case also be embodied to be phase-shifted with respect to one another. In accordance with the mentioned prior art, each multiphase winding is furthermore connected to a power converter. Said power converters are in turn arranged in three groups and are connected within the group to form a cascaded arrangement.

EP 2 426 804 A1 furthermore discloses a method for charging a battery of an electric vehicle. In this case, the energy is drawn from a storage system, wherein the energy of the storage system originates from the power supply system, fed from conventional or regenerative power generators.

ASPECTS AND SUMMARY OF THE INVENTION

According to one aspect of the present invention, there is provided a power converter arrangement, for feeding a plurality of energy stores of electrically driven vehicles has a transformer having a first multiphase winding and a plurality of second multiphase windings. The first winding is embodied to be connected to a power supply system, in particular to a medium-voltage power supply system, and the second windings are each connected to a first connection of an associated power converter. The invention also presents an installation having such a power converter arrangement, wherein the transformer is arranged in a weatherproof enclosure and at least a plurality of power converters form parts of respective charging stations.

With knowledge of the circumstances mentioned, the invention is based on the objects and aspects of presenting a power converter arrangement for feeding a plurality of energy stores of electrically driven vehicles and an installation comprising the same in combination as in a kit or assembly form, wherein the power converter arrangement, as well as the installation, is adapted as well as possible to different requirements with respect to current, voltage and power of the vehicles to be charged.

This object is achieved in accordance with the invention by a power converter arrangement having the features as claimed herein, and by an installation having the features as claimed herein.

The power converter arrangement according to the invention, for feeding a plurality of energy stores of electrically driven vehicles, is embodied to have a transformer having a first multiphase winding and a plurality of second multiphase windings, wherein the first winding is embodied to be connected to a power supply system, in particular to a medium-voltage power supply system, and wherein the second windings are each connected to a first connection of an associated power converter.

In one alternative preferred configuration of the transformer, said transformer has first groups of second windings, which are phase-shifted relative to one another. It is essential here that, by the phase offset of the second windings of the transformer of the power converter arrangement, preferably provided DC voltage sources such as, for example, a local energy store or a solar array, for feeding the power converter arrangement can be optimally loaded. To this end, the first, groups can be formed, for example, by each group having the same number of members. Alternatively, the group size can also be defined by each first group having the same rated load. It is preferred if there are only two or three first groups.

In one alternative preferred configuration of the transformer, said transformer has second groups of second windings, which have different rated output voltages. The downstream power converters can therefore be adapted in an ideal manner to their rated feed voltage, for feeding the respective energy stores. In this case, voltage adaptation by means of DC voltage converters can then be omitted, preferably entirely, in the power converters. The respective rated output voltage is preferably adapted in accordance with the generally known prior art by adapting the respective number of windings.

It is alternatively preferred if the first multiphase winding is embodied as a three-phase winding. It is likewise preferred if all the multiphase second windings are likewise embodied as three-phase windings. This of course means the configuration of a three-phase transformer having a plurality of secondary windings, said configuration being routine in the art.

It is alternatively particularly preferred if the respective second windings are connected in a point-to-point connection to the respectively associated power converter. This of course means the load connection. Moreover, the power converters can even be connected to one another in a preferred manner using data lines. Data lines should be understood as meaning in the broadest sense all lines for exchanging information or control signals but explicitly not connections that carry a load current. To this end, in particular, a central control device, which is embodied to actuate at least a plurality, preferably all, of the power converters, is preferably provided.

It is further alternatively preferred if first and second windings of the transformer, more precisely the primary-side or secondary-side connections of the transformer, are connected up with protective and control technology. Said technology is embodied, in particular, for overvoltage protection or as load and voltage dividers, and embodied in accordance with the respectively applicable standards. The secondary-side connections are advantageously executed in accordance with the respectively applicable safety requirements for the charging of electrically driven vehicles.

It is advantageous if the transformer has a relative short-circuit voltage of at least 7%, preferably of at least 10% and particularly preferably of at least 15%. This is advantageous because the efficiency of preferably provided active filters, in particular used for harmonic compensation, is improved thereby.

In one alternatively preferred configuration of the power converter arrangement, at least one power converter is embodied as an AC/AC converter. At least one of said AC/AC converters is preferably connected by way of its second connection to a filter, preferably embodied according to the prior art, as a result of which an active filter is formed.

In one alternatively preferred configuration of the power converter arrangement, at least one power converter is embodied as an AC/DC converter. At least one of said AC/DC converters is preferably connected by way of its second connection to a local energy store belonging to the power converter arrangement. Local energy stores can be embodied, in particular, as rechargeable batteries or capacitors, for example as so-called supercaps, or combinations thereof.

In principle, a step-down converter can be arranged downstream of an AC/DC converter.

In one alternatively particular embodiment, there is at least one power converter, preferably the majority of the power converters, forms, by way of its respectively associated second connection, the load connection for the vehicle.

The installation according to one aspect of the invention is embodied to have an above-described power converter, wherein the transformer is arranged in a weatherproof enclosure and has a plurality of charging stations, wherein at least one, preferably exactly one, power converter is associated with one charging station. In addition, it is advantageous if a plurality of power converters, for example in each case one embodied as an AC/AC converter and one embodied as an AC/DC converter, are associated with one charging station. The respective charging station can therefore provide charging by both alternating current and by direct current.

A weatherproof enclosure should be understood to mean, in principle, any physical measure that protects the transformer from environmental influences. It goes without saying that the charging stations, more precisely the power converters arranged there, are connected to the transformer by means of suitable cabling that is routine in the art.

The respective power converter associated with a charging station is preferably arranged either in the charging station itself or in the enclosure.

The transformer is preferably connected by way of its first winding to a supply system, preferably a medium-voltage system, preferably in the range of a few tens of kilovolts.

It is particularly preferred if an active filter having an associated AC/AC converter is arranged in the enclosure. Alternatively and preferably even additionally, a local energy store having an associated AC/DC converter is likewise arranged in the enclosure.

It shall be understood that in the various configurations of the invention, that is to say of the power converter arrangement, and also of the installation comprising the same, can be realized individually or in arbitrary combinations in order to achieve improvements. In particular, the features mentioned above and explained here or hereinafter can be used not only in the combinations indicated, but also in other, non-mutually exclusive combinations or by themselves, without departing from the scope of the present invention.

Further explanations of the invention, advantageous details and features, are evident from the following description of the exemplary embodiments of the invention as illustrated schematically in FIGS. 1 to 4, or from respective parts thereof.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
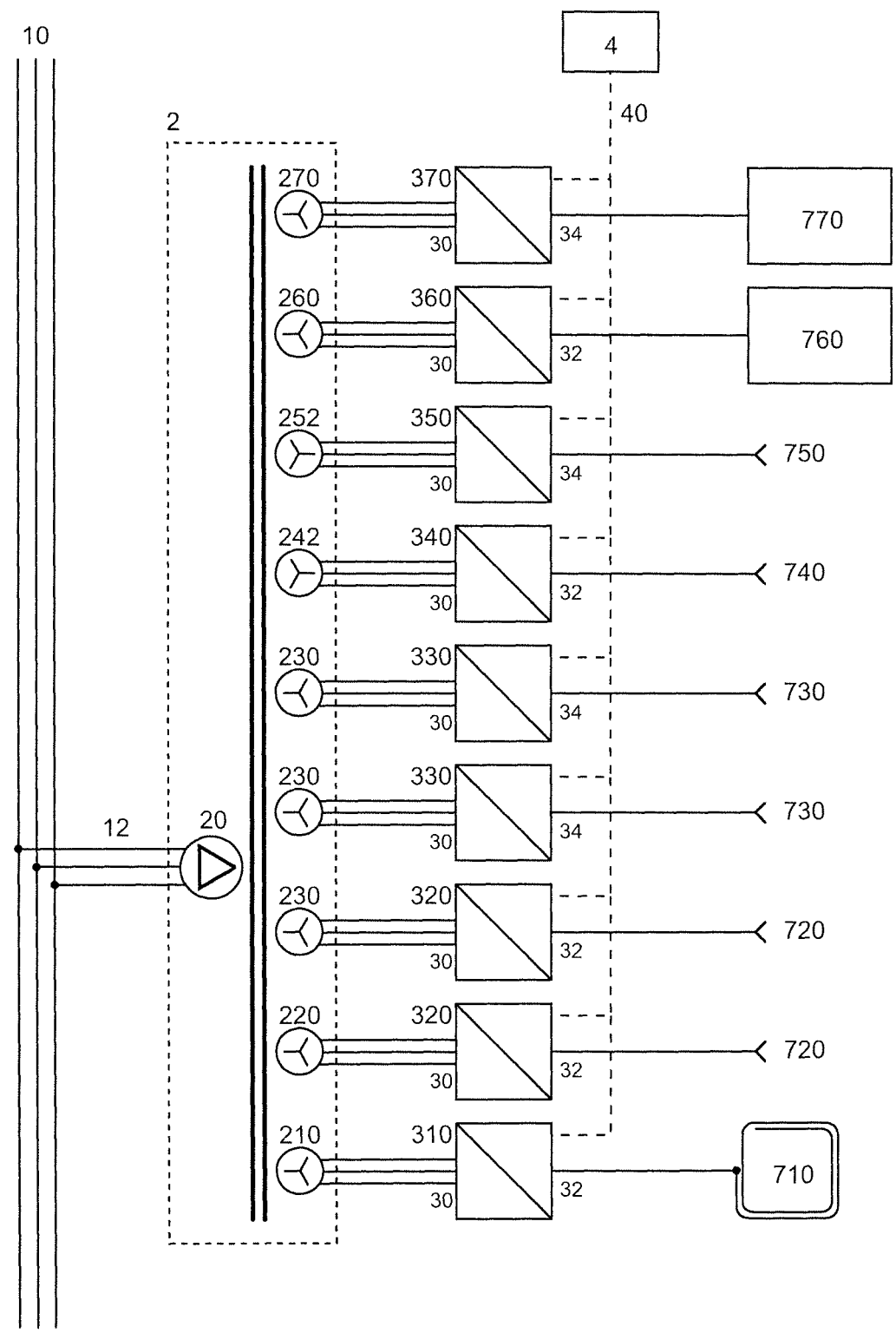
FIG. 1 shows a power converter arrangement according to the invention.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art.

Those of skill would further appreciate that the various illustrative logical blocks, modules, circuits, and algorithm steps described in connection with the embodiments disclosed herein may be implemented as electronic hardware, computer software running on a specific purpose machine that is programmed to carry out the operations described in this application, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

FIG. 1 shows a power converter arrangement according to the invention. A three-phase 20 kV medium-voltage system 10 is illustrated, wherein the invention is not limited to this voltage range. Said medium-voltage system 10 feeds a transformer 2, the first, that is to say primary-side, three-phase winding 20 of which, without restricting the generality, is connected in delta.

The secondary side of the transformer 2 has a plurality of three-phase second windings 210, 220, 230, 242, 252, 260, 270, which, without restricting the generality, are each connected in a star pattern for convenience.

The second windings 210, 220, 230, 242, 252, 260, 270 in this case form two first groups, wherein the first first group (2n0, where n=1, 2, 3, 6, 7) and the second first group (2m2, where m=4, 5) are formed in a phase-shifted manner relative to one another.

Furthermore, the second windings 210, 220, 230, 242, 252, 260, 270 form second groups, wherein the groups differ in terms of their rated voltage and hence also in terms of their respective number of windings.

Each three-phase second winding 210, 220, 230, 242, 252, 260, 270 is connected in each case in a three-phase manner to an associated first connection 30 of a respective power converter 310, 320, 330, 340, 350, 360, 370 in the form of a point-to-point connection.

The exemplary power converter arrangement illustrated here has a first power converter 310, which is embodied as an AC/AC converter and the second connection 32, the output connection, of which is connected to a coil 710 for the inductive charging of a vehicle (shown later). An exemplary rated voltage of 400 V at a frequency in the kilohertz range is present at the second connection 32 of the first power converter. The power converter 310 is embodied to provide a charging current of at most 63 A.

The exemplary power converter arrangement illustrated here has two second power converters 320, 320, which are each embodied as AC/AC converters and the respective second connection 32, 32, the output connection, of which is connected to a charging cable for the so-called plug-in charging of a vehicle (shown later). A rated voltage of 400 V at a frequency of 50 Hz is respectively present at the second connection 32 of the second power converter. The respective power converter 320 is embodied to provide a charging current of at most 63 A.

The exemplary power converter arrangement illustrated here also has two third power converters 330, which are each embodied as AC/DC converters and the respective second connection 34, the output connection, of which is connected to a charging cable for the so-called plug-in charging of a vehicle. A rated voltage of 800 V is respectively present at the second connection 34 of the third power converter 330. The respective power converter 330 is embodied to provide a charging current of at most 150 A.

The exemplary power converter arrangement illustrated here also has a fourth power converter 340, which is embodied as an AC/AC converter and the respective second connection 32, the output connection, of which is connected to a charging cable for the so-called plug-in charging of a vehicle. A rated voltage of 400 V at a frequency of 50 Hz is respectively present at the second connection 32 of the fourth power converter 340. The respective power converter 340 is embodied to provide a charging current of at most 120 A.

The exemplary power converter arrangement illustrated here also has a fifth power converter 350, which is embodied as an AC/DC convertor and the second connection 34, the output connection, of which is connected to a charging cable for the so-called plug-in charging of a vehicle. A rated voltage of 800 V is present at the second connection 34 of the fifth power converter 350. The respective power converter 350 is embodied to provide a charging current of at most 350 A.

All exemplary previous currents paths from the transformer 2 to the output 32 of the respective power converter 310, 320, 332, 342, 350 are embodied in a unidirectional manner with a flow of energy from the power supply system 10 to the output 32, 34 of the respective power converter. However, this configuration is only exemplary, not obligatory.

Figure 2:
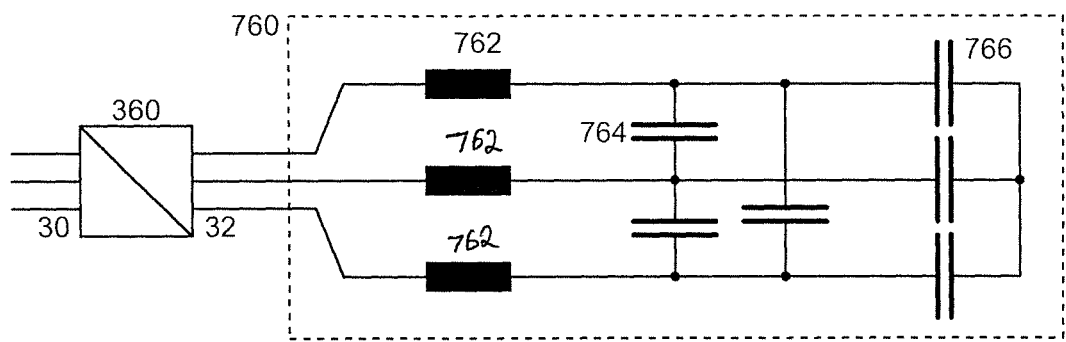
FIG. 2 shows an active filter of the power converter arrangement in accordance with FIG. 1.

The exemplary power converter arrangement illustrated here also has a sixth power converter 360, which is embodied as an AC/AC converter and the second connection 32, the output connection, of which is connected to a filter 760, as is illustrated by way of example in FIG. 2. This current path is therefore embodied in a bidirectional manner and forms an active filter from the power converter 360 and the filter 760. The real load of the power supply system 10 can, for example, be brought closer to a desired sinusoidal load using said active filter. The active filter can also serve for reactive power compensation.

The filter 760 itself is formed in a manner routine in the art by means of coils 762 and capacitors 764, 766.

The exemplary power converter arrangement illustrated here also has a seventh power converter 370, which is embodied as an AC/DC converter and the second connection 34, the output connection, of which is connected to an energy store 770. Said energy store 770 primarily serves as a buffer store in the case of a high load on the entire power converter arrangement and for bypassing in the case of a failure of the power supply system. The energy store 770 can furthermore serve to compensate for peak loads in the power supply system. On the one hand, energy from the power supply system can be stored for said active power compensation and, on the other hand, energy can be fed back into the power supply system.

All of the abovementioned values with respect to voltage, frequency and current represent exclusively exemplary values that can be realized reasonably. However, various other configurations are of course also possible as would be recognized by those of skill in the art only after a study of the enclosure herein.

A central control device 4, which has a connection 40 to all of the power converters and in this case is embodied to actuate all of the power converters 310, 320, 330, 340, 350, 360, 370 of the power converter arrangement, is further illustrated. In this case, operating parameters of the power converters and, if required, also of the transformer 2 are detected and the power converters 310, 320, 330, 340, 350, 360, 370 are accordingly partly controlled or at least the local control of said power converters is influenced. For example, the output power of the individual power converters can be regulated in a selective manner if required.

Figure 3:
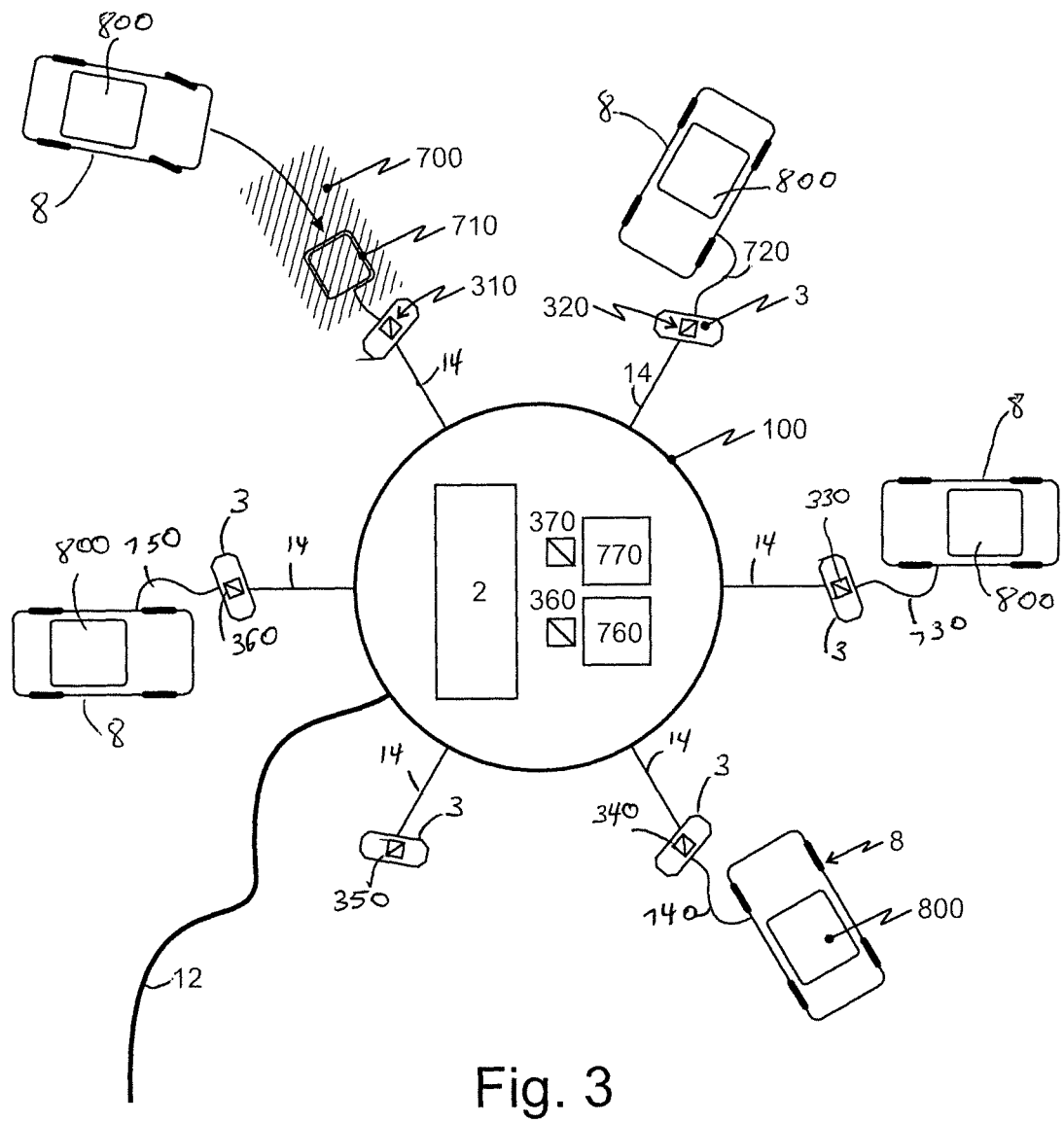
FIGS. 3 and 4 show two configurations of an installation according to the invention.
Figure 4:
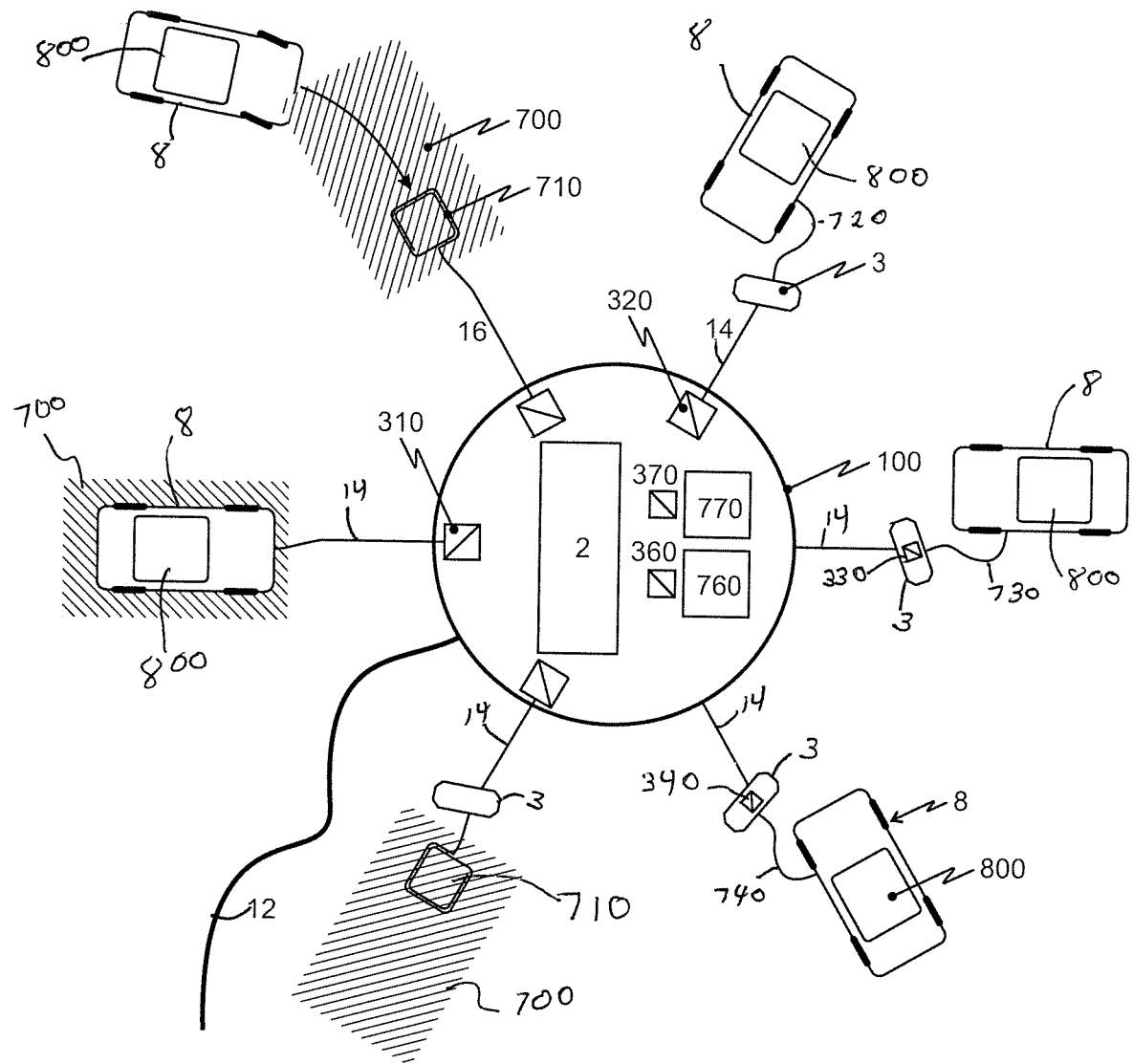

FIGS. 3 and 4 additionally show two adaptive configurations or systems of an installation according to the invention. Both configurations or systems have a transformer 2, an active filter 760 and an energy store 770 together with an associated power converter 360, 370 in a central enclosure 100. For the supply of energy, the transformer 2 is connected to a medium-voltage system (not illustrated) by means of a connecting line 12, cf. FIG. 1. The installations are embodied here purely by way of example for charging the energy stores 800 of six vehicles 8 in each case, and will be understood after review of this disclosure as being adaptive to a number of vehicles according to a designers intentions during system design In FIG. 3, the respectively first connections of (for example) six power converters are connected to the transformer 2 by means of earth lines 14. Each of said power converters is arranged in an associated charging station 3. Charging cables 720, 730, 740, 750 emerge from five of said power converters, more precisely from the second connections thereof, cf. also FIG. 1, said charging cables serving for connection to a vehicle 8 and for plug-in charging of the energy stores 800 of said vehicles 8.

The second connection of a power converter of a charging station 3 is connected to an induction coil 710 for contactless charging of a vehicle 8. To this end, a position area 700 in which the vehicle 8 is parked and charged is provided.

In FIG. 4, in two of the six charging stations 3, the power converters are likewise provided in the charging stations, whereas one of the power converters is arranged in the central enclosure 100.

In the remaining three charging stations, which are all provided here for contactless, inductive charging of the energy stores 800 of the vehicles 8, the associated power converters are arranged in the enclosure 100 and the second connections thereof are in turn connected to the induction coils 710 by means of earth lines 16.

Within the context of the installation, it can be particularly advantageous, in principle, if the central control device of said installation is informed of the necessary parameters of the vehicle to be charged as early as before the beginning of a charging process. To this end, the vehicle communicates with the installation as early as during the approach to said installation. The charging station that is best suited to the vehicle can therefore be allocated.

The information obtained beforehand can furthermore serve to optimize superordinate tasks, such as reactive power compensation, for example. For example, the vehicle can be allocated to the charging station whose associated second winding of the transformer has the phase best suited for said task.

The various illustrative logical blocks, modules, and circuits described in connection with the embodiments disclosed herein, may be implemented or performed with a general or specific purpose processor, or with hardware that carries out these functions.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

Also, the inventors intend that only those claims which use the words "means for" are intended to be interpreted under 35 USC 112, sixth paragraph. Moreover, no limitations from the specification are intended to be read into any claims, unless those limitations are expressly included in the claims.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A power converter arrangement, for feeding a plurality of energy stores (800) of electrically driven vehicles (8), comprising:
   a transformer (2) having a first multiphase winding (20) and a plurality of second multiphase windings (210, 220, 232, 242, 250, 260, 270);
   the first multiphase winding (20) is embodied as a three-phase winding;
   at least one of the second multiphase windings (210, 220, 230, 242, 252, 260, 270) is embodied as a three-phase winding;
   said transformer (2) has a relative short-circuit voltage of at least 7%;
   the first winding (20) connected to a power supply system (10);
   each said second winding is directly connected to a respective first connection (30) of an associated one of a plurality of power converters (310, 320, 330, 340, 350, 360, 370);
   at least one of said second windings is phase-shifted relative to at least one other of said plurality of said second windings;
   at least one of said second windings has a different rated output voltage from at least one other rated output voltage of another said plurality of second windings;
   each said respective second windings (210, 220, 230, 242, 252, 260, 270) is connected by a direct point-to-point connection with each respectively associated one of said plurality of power converters (310, 320, 330, 340, 350, 360, 370);
   at least one of said plurality of power converters (310, 320, 330, 340, 360) is an AC/AC converter;
   at least one other of said plurality of power converter (330, 350, 370) is an AC/DC converter;
   a step-down converter is connected downstream of at least one of said other power converters (330, 350, 370);
   at least one of said plurality of power converters (310, 320, 330, 340) has a second connection extending therefrom and said second connection forms a respective direct charging connection (710, 720, 730, 740) for said electrically driven vehicles (8); and
   said at least one AC/AC power converter (360) connects to a filter (760) via its respective said second connection (32) and forms an active filter.

2. The power converter arrangement, according to claim 1, wherein:

said at least one AC/AC power converter (370) connects via its respective said second connection (34) to a local energy store (770) of said power converter arrangement.

3. The power converter arrangement, according to claim 1, further comprising:
a central control device (4) is embodied to actuate at least a plurality of said power converters.

4. A power converter installation, comprising:
at least one power converter arrangement, according to claim 1, wherein:
the transformer (2) is arranged in a weatherproof enclosure (100); and
at least one charging station (3) is electrically associated with said at least one power converter arrangement.

5. The power converter installation, according to claim 4, wherein:
said at least one power converter arrangement, associated with said at least one charging station (3), is arranged either within said at least one charging station or within said weatherproof enclosure.

6. The power converter installation, according to claim 4, wherein:
the transformer (2) is connected by said first multiphase winding (20) to a voltage supply system.

7. The power converter installation, according to claim 4, wherein:
said active filter (760) having an associated said AC/DC converter (360) is arranged within said weatherproof enclosure; and further comprises:
a local energy store (770) having an associated AC/AC converter (370) is arranged within said weatherproof enclosure.

* * * * *